(12) United States Patent
Escobar et al.

(10) Patent No.: US 9,030,854 B2
(45) Date of Patent: May 12, 2015

(54) METHOD AND APPARATUS FOR ZERO-SEQUENCE DAMPING AND VOLTAGE BALANCING

(71) Applicant: ABB Research Ltd, Zürich (CH)

(72) Inventors: Gerardo Escobar, Merida (MX); Sami Pettersson, Wettingen (CH); Ngai-Man Ho, Fislisbach (CH)

(73) Assignee: ABB Research Ltd, Zürich (CH)

( * ) Notice: Subject to any disclaimer, the term of this patent is extended or adjusted under 35 U.S.C. 154(b) by 168 days.

(21) Appl. No.: 13/912,398

(22) Filed: Jun. 7, 2013

(65) Prior Publication Data

US 2013/0329471 A1  Dec. 12, 2013

(30) Foreign Application Priority Data

Jun. 7, 2012  (EP) .................................... 12171143

(51) Int. Cl.
*H02M 7/537* (2006.01)
*H02M 7/42* (2006.01)
*H02M 7/487* (2007.01)
(Continued)

(52) U.S. Cl.
CPC ................ *H02M 7/42* (2013.01); *H02M 1/126* (2013.01); *H02J 3/383* (2013.01); *H02M 7/487* (2013.01); *H02M 2001/123* (2013.01); *Y02E 10/563* (2013.01)

(58) Field of Classification Search
CPC ......... H02M 7/42; H02M 7/493; H02M 7/53; H02M 7/53873; H02M 7/53875
USPC .......................... 363/40, 98; 323/906; 307/82
See application file for complete search history.

(56) References Cited

U.S. PATENT DOCUMENTS

| | | | | |
|---|---|---|---|---|
| 5,361,196 A | * | 11/1994 | Tanamachi et al. | ............. 363/98 |
| 2008/0298103 A1 | | 12/2008 | Bendre et al. | |
| 2009/0003024 A1 | | 1/2009 | Knaup | |

(Continued)

FOREIGN PATENT DOCUMENTS

| EP | 2107672 A1 | 10/2009 |
|---|---|---|
| EP | 2362515 A9 | 8/2011 |

(Continued)

OTHER PUBLICATIONS

European Search Report issued on Jan. 23, 2013 for European Application No. 12171143.6.

(Continued)

*Primary Examiner* — Adolf Berhane
*Assistant Examiner* — Jye-June Lee
(74) *Attorney, Agent, or Firm* — Buchanan Ingersoll & Rooney PC

(57) ABSTRACT

An exemplary method and an apparatus implementing the method for an arrangement having a three-phase, multi-level inverter, an output LCL-filter connecting the inverter to a grid, and a virtual-ground connection between the LCL-filter and the neutral point of the DC-link. The method includes determining a zero-sequence component of an LCL-filter inverter-side current, calculating a zero-sequence damping and balancing voltage term based on the LCL-filter inverter-side current zero-sequence component and voltages over the two halves of the DC-link, and adding the zero-sequence damping and voltage balancing term to the output voltage reference.

15 Claims, 6 Drawing Sheets

(51) Int. Cl.
   *H02M 1/12* (2006.01)
   *H02J 3/38* (2006.01)

(56) References Cited

U.S. PATENT DOCUMENTS

| | | | |
|---|---|---|---|
| 2009/0244936 A1 | 10/2009 | Falk et al. | |
| 2011/0141786 A1 | 6/2011 | Shen et al. | |
| 2011/0221420 A1 | 9/2011 | Coccia et al. | |
| 2012/0206948 A1* | 8/2012 | Maldini et al. | 363/97 |

FOREIGN PATENT DOCUMENTS

| | | | |
|---|---|---|---|
| EP | 2375552 A1 | 10/2011 | |
| WO | WO 2011124605 A2 * | 10/2011 | |

OTHER PUBLICATIONS

G. Escobar, A Model-Based Controller for a Three-Phase Four-Wire Shunt Active Filter with Compensation of the Neutral Line Current, IEEE Transactions on Power Electronics, vol. 22, No. 6, Nov. 2007, pp. 2261-2270.

K.C. Oliveira, Transformerless Photovoltaic Systems Using Neutral Point Clamped Multilevel Inverters, Industrail Electronics (ISIE), IEEE International Symposium, Jul. 4, 2010, pp. 1131-1136.

M. Marchesoni, M. Mazzucchelli, F.V.P. Robinson and P. Tenca, "A minimum-energy-based capacitor voltage balancing control strategy for MPC conversion systems," in Proc. IEEE International Symposium on Industrial Electronics ISIE'99, 1999, vol. 1, pp. 20-25.

J. Pou, R. Pindado, D. Boroycvich, P. Rodriguez and J. Vicente, "Voltage-balancing strategies for diode-clamped multilevel converters," in IEEE 35th Annual Power Electronics Specialists Conference PESC'04, 2004 vol. 5, Jun. 20-25, 2004, pp. 3988-3993.

H.A. Hotait, A.M. Massoud, S.J. Finney and B.W. Williams, "Capacitor Voltage Balancing Using Redundant States for Five-Level Multilevel Inverter," in Proc. 7th International Conference on Power Electronics and Drive Systems PEDS '07, 2007, pp. 1062-1068.

D.W. Kang, C.S. Ma, T.J. Kim and D.S. Hyun, "Simple control strategy for balancing the DC-link voltage of neutral-point-clamped inverter at low modulation index," IEE Proceedings—Electric Power Applications, vol. 151(5), pp. 569-575, 2004.

S. Wei, N. Zargari, B. Wu and S. Rizzo, "Comparison and mitigation of common mode voltage in power converter topologies," in Proc. IEEE 39th Annual Meeting Industry Applications Conference IAS'04, 2004, vol. 3, pp. 1852-1857.

M.C. Cavalcanti, K.C. de Oliveira, A.M. de Farlas, F.A.S. Neves, G.M.S. Azevedo and F.C. Camboim, "Modulation Techniques to Eliminate Leakage Currents in Transformerless Three-Phase Photovoltaic Systems," IEEE Trans. on Industrial Electronics, vol. 57(4), pp. 1360-1368, Apr. 2010.

T. Kerekes, M. Liserre, R. Teodorescu, C. Klumpner and M. Sumner, "Evaluation of Three-Phase Transformerless Photovoltaic Inverter Topologies," IEEE Trans. on Power Electronics, vol. 24(9), pp. 2202-2211, Sep. 2009.

H. Zhang, A. Von Jouanne, D. Shaoan, A.K. Wallace and F. Wang, "Multilevel inverter modulation schemes to eliminate common-mode voltages," IEEE Trans. on Industry Appl., vol. 36(6), pp. 1645-1653, Nov./Dec. 2000.

R.M. Cuzner, A.R. Bendre, P.J. Faill, B. Semenov, "Implementation of a Four Pole Neutral-Point Clamped Three Phase Inverter with Low Common Mode Voltage Output," IEEE 42nd Annual Meeting Industry Applications Conference IAS'07, 2007, pp. 923-930.

A. von Jouanne, S. Dai and H. Zhang, "A multilevel inverter approach providing DC-link balancing, ride-through enhancement, and common-mode voltage elimination," IEEE Trans. on Industrial Electronics, vol. 49(4), pp. 739-745, Aug. 2002. Gerardo Escobar ABB Switzerland Ltd. pp. 18 of 18 9ADB002756-021.

D.A. Rendusara, P.N. Enjeti, "An improved inverter output filter configuration reduces common and differential modes dv/dt at the motor terminals in PWM drive systems," IEEE Trans. on Power Electronics, vol. 13(6), pp. 1135-1143, Nov. 1998.

J.W. Kolar, U. Drofenik, J. Minibock and H. Ertl, "A new concept for minimizing highfrequency common-mode EMI of three-phase PWM rectifier systems keeping high utilization of the output voltage," in Proc. 15th Annual IEEE Applied Power Electronics Conference and Exposition APEC'00, vol. 1, 2000, pp. 519-527.

D.G. Holmes and T.A. Lipo, Pulse Width Modulation for Power Converters: Principles and Practice, IEEE Press, Series on Power Engineering, USA, 2003, pp. 226-230.

V. Blasko and V. Kaura, "A novel control to actively damp resonance in input LC filter of a three-phase voltage source converter," IEEE Trans. on Ind. Appl., vol. 33(2), pp. 542-550, Mar./Apr. 1997.

A. Papavaslllou, S.A. Papathanassiou, S.N. Manias and G. Demetriadis, "Current control of a voltage source inverter connected to the grid via LCL filter," in Proc. IEEE Power Electronics Specialists Conf. PESC'07, Jun. 17-21, 2007, pp. 2379-2384.

L.A. Serpa, S. Ponnaluri, P.M. Barbosa and J.W. Kolar, "A modified direct power control strategy allowing the connection of three-phase inverters to the grid through LCL filters," IEEE Trans. on Ind. Appl., vol. 43(5), pp. 1388-1400, Sep./Oct. 2007.

A. Nabae, I. Takahashi and H. Akagi, "A New Neutral-Point-Clamped PWM Inverter," IEEE Trans. on Industry Appl., vol. IA-17(5), pp. 518-523 Sep./Oct. 1981.

G. Escobar, J. Leyva-Ramos, J.M. Carrasco, E. Galvan, R.C. Portillo, M.M. Prats, L.G. Franquelo, "Modeling of a three level converter used in a synchronous rectifier application," in Proc. IEEE 35th Annual Power Electronics Specialists Conference PESC 04, 2004, vol. 6, pp. 4306-4311.

V. Kaura and V. Blasco, "Operation of a phase locked loop system under distorted utility conditions," IEEE Trans. on Ind. Appl., vol. 33, Issue 1, pp. 58-63, Jan./Feb. 1997.

* cited by examiner

METHOD AND APPARATUS FOR ZERO-SEQUENCE DAMPING AND VOLTAGE BALANCING

RELATED APPLICATION(S)

This application claims priority under 35 U.S.C. §119 to European Patent Application No. 12171143.6 filed in Europe on Jun. 7, 2012, the content of which is hereby incorporated by reference in its entirety.

FIELD

The present disclosure relates to multi-level inverters, and particularly to minimizing common-mode voltage and imbalances in DC-link voltages.

BACKGROUND INFORMATION

Balancing of capacitor voltages is an issue which can naturally arise in multilevel topologies, or whenever the DC-link voltage is split in a topology for a special purpose, for instance, to allow connection to a neutral grid point. Solutions for this issue have been largely reported in the literature [1]-[2].

In document [1], the authors propose use of an energy function which is minimized in real time by evaluating redundant control vectors of a multi-level converter. A similar idea is followed in document [2] where the authors explore two strategies also based on the use of redundancies and minimizing a cost function in terms of the voltage imbalance. In document [3], capacitor voltages are balanced using redundant states for five-level converters. In document [4], a modulation strategy for guaranteeing balancing of DC-link capacitor voltages is presented. The proposed strategy in document [4] is based on a modified discontinuous PWM.

Another issue in three-phase inverters involves the generation of common-mode voltage (CMV). This issue has attracted attention recently, since it has become more evident, for example, in transformerless applications, where no galvanic isolation is available as described in document [5]. CMV is an issue which can be associated with the inverter topology and the modulation algorithm used. CMV can, for example, be induced by an inverter itself, and can then be propagated to the equipment connected to the inverter, causing severe adverse effects.

The CMV can manifest itself as a zero-sequence voltage fluctuation with respect to ground. The zero-sequence voltage fluctuation can, depending on the application, cause indirect grid current distortion, additional losses and safety issues, among other things as described in document [6]. For instance, CMV in electric drives can create bearing currents which can cause physical damage to electrical machines. CMV can also cause considerable leakage current to flow through the parasitic capacitances of photovoltaic (PV) panels supplying an inverter.

A known solution to the CMV problem involves splitting the DC-link of the inverter into two halves and connecting the mid-point of the DC-link to the neutral point of the grid as described in document [7]. After this modification, each leg in the inverter bridge is controlled independently as if they were three independent single-phase systems. However, this modification reduces utilization of the DC voltage, e.g., it limits the modulation index. Moreover, an additional balance strategy can be specified to guarantee that both halves in the DC-link maintain the same voltage.

In multi-level inverters, there can also be a possibility to eliminate the CMV by avoiding certain switching control vectors which produce CMV. In document [8], it is shown that inverters with an odd number of levels can avoid generating common-mode voltage by switching among certain available states.

However, when switching states are restricted, it is no longer possible to guarantee the balance of capacitor voltages. DC-link voltage balancing (or neutral point balancing) and CMV cancelation cannot be achieved concurrently without hardware modifications as described in document [11]. Thus, some authors have proposed inserting a fourth leg to handle the DC-link voltage balancing issue as described in documents [9]-[11]. The added fourth leg can, however, increase the complexity and decrease the cost-effectiveness of the inverter.

Another approach is disclosed in document [12], where a filter is proposed for a three-phase adjustable-speed motor drive. The filter can be disposed in a three-phase LRC network at the output of a two-level inverter, where a filter star point is electrically connected to a DC-link midpoint, thus capacitively forming an artificial mains neutral star point. A similar idea is used in a rectifier system of document [13]. The filter can passively reduce both the differential and the CMV without an added fourth leg. On the other hand, resistors in the filter introduce additional losses to the system, thus, reducing the efficiency of the system.

SUMMARY

An exemplary method for minimizing common mode voltage in an arrangement having a three-phase, multi-level inverter having a DC-link with a neutral point dividing the DC-link into two halves is disclosed, wherein an output voltage of the inverter is controlled on the basis of an output voltage reference, an output LCL-filter connecting the inverter to a grid, and a virtual-ground connection between the LCL-filter and the neutral point of the DC-link, the method comprising: determining a zero-sequence component of an LCL-filter inverter-side current; calculating a zero-sequence damping and voltage balancing term based on the LCL-filter inverter-side current zero-sequence component and voltages over the two halves of the DC-link; and adding the zero-sequence damping and voltage balancing term to the output voltage reference.

An exemplary apparatus for an arrangement having a three-phase, multi-level inverter including a DC-link with a neutral point dividing the DC-link into two halves is disclosed, wherein an output voltage of the inverter is controlled based on an output voltage reference, an output LCL-filter connecting the inverter to a grid, and a virtual-ground connection between the LCL-filter and the neutral point of the DC-link, the apparatus comprising a controller configured to: determine a zero-sequence component of an LCL-filter inverter-side current; calculate a zero-sequence damping and voltage balancing term based on the LCL-filter inverter-side current zero-sequence component and voltages over the two halves of the DC-link; and add the zero-sequence damping and voltage balancing term to the output voltage reference.

BRIEF DESCRIPTION OF THE DRAWINGS

In the following the disclosure will be described in greater detail through exemplary embodiments with reference to the accompanying drawings, in which.

DETAILED DESCRIPTION

Figure 1:
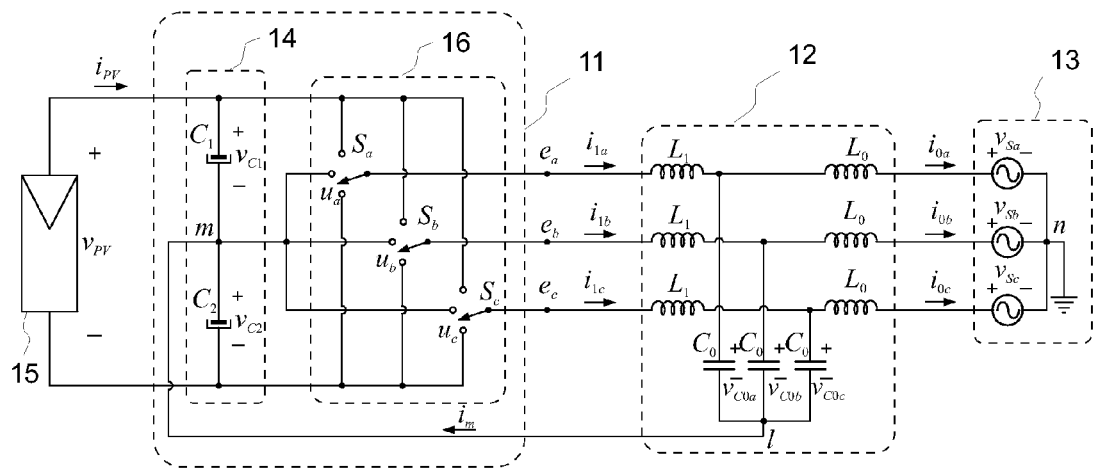
FIG. 1 illustrates an arrangement including a three-phase, three-level inverter and an output LCL-filter connecting the inverter to a grid in accordance with an exemplary embodiment of the present disclosure.

Exemplary embodiments of the present disclosure provide a method and an apparatus so as to alleviate the above disadvantages.

This result can be achieved through a multi-phase inverter connected to the grid through an LCL-filter. The inverter topology includes an artificial mains neutral star point connection, which is referred in this disclosure as a virtual-ground (VG) connection. The VG represents a good option for the minimization of the CMV. In order to form the VG, a star point formed by the capacitors of the LCL-filter is connected to a mid-point of the DC-link.

The use of a virtual-ground allows also maximum utilization of the DC-link voltage. The DC-link voltage can be lowered by using a third-harmonic reference injection method. Thus, semiconductor devices in the inverter bridge of the inverter can be exposed to lower voltages, which, in turn, can reduce losses.

Since the capacitors in the DC-link are split, and the DC-link has a VG connection, a voltage balance issue can arise. Exemplary embodiments of the present disclosure provide a method that guarantees the voltage balance in average.

An additional resonance can also be induced by a DC-link capacitor voltage imbalance and zero-sequence components LCL-filter of the inverter-side current and voltage. The disclosed method can attenuate the zero-sequence resonance by actively inserting an appropriate damping. Compared with passive damping methods, where resistors have to be inserted in the LCL-filter, the use of an active damping method, allows reduction in losses.

As already discussed, a virtual-ground connection is a good option for eliminating CMV. A three-phase, multi-level inverter with an output LCL-filter can be provided with a neutral point dividing the DC-link into two halves. The inverter can then be provided with a virtual-ground connection between the LCL-filter and the neutral point. The virtual-ground connection creates a low impedance path where high frequency harmonic components can circulate, thus avoiding their circulation towards the grid. The high frequency harmonic components can, for instance, be induced by switching of devices in an inverter bridge.

The low impedance path, provided by the virtual-ground connection, minimizes the effect that the high frequency components have on DC or low frequency voltage between a power source at the inverter input and ground. In fact, the high frequency components are able to flow through the low impedance path. Also, compared with the approach based on addition of a fourth leg, the virtual-ground approach can significantly reduce the CMV component at the switching frequency.

In multi-level neutral-point-clamped (NPC) topologies, where the DC-link is split into a top half and a bottom half and a VG connection is used, a voltage balancing issue can arise. The present disclosure can provide a method and an apparatus implementing the method for balancing the DC-link voltages (or, equivalently, regulating the neutral point).

Another issue which can arise in applications including an LCL-filter is damping of a resonance at the resonance frequency of the LCL-filter. Several approaches for the active damping injection in LCL-filters have been proposed so far [16] to [18].

However, an imbalance in the DC-link and zero-sequence components in LCL-filter inverter-side current and voltage can produce an additional resonance. The disclosed method attenuates this resonance by actively inserting an appropriate damping.

The disclosed method can operate independently from a main control loop. The main control loop can, for instance, control transfer of power through an LCL-filter from a photovoltaic (PV) array to a grid. The main control loop can also incorporate a method for damping a resonance at the resonance frequency of the LCL-filter.

When the main control loop uses a voltage reference to control the output voltage, the disclosed method can be used to calculate a zero-sequence damping and voltage balancing term which can then be added to the voltage reference.

The zero-sequence damping and the voltage balancing term can be calculated on the basis of the LCL-filter inverter-side current zero-sequence component, and voltages over the two halves of the DC-link. The LCL-filter inverter-side current zero-sequence component can be determined, for instance, on the basis of a current flowing through the virtual-ground connection. The voltage difference between the two halves of the DC-link and the voltage over the whole DC-link can be calculated by determining a top half DC-link voltage and a bottom half DC-link voltage. These voltages can be determined by, for instance, measuring.

The disclosed damping and balancing method can be used independently from the main control loop controlling an output voltage of the inverter.

A virtual-ground connection also allows maximum utilization of the DC-link voltage. The connection towards the grid can still be a three-wire connection with no physical connection to the grid neutral point. This means there is no circulation or negligible circulation of zero-sequence current towards the ground. Thus, a third-harmonic reference injection method can be used to extend the range of the modulation index, or equivalently, to allow maximum optimization of the DC-link voltage. In document [14], a third-harmonic reference injection is used to achieve a modulation range increase of 15%. This can be a considerable improvement in terms of efficiency in producing grid-side inverter voltages. The voltage level over the DC-link can be reduced, which, in turn, can reduce the stress in the switching devices, thus, resulting in a reduction in losses.

The third-harmonic injection can be incorporated into the calculation of the damping and balancing term. However, it can be specified to first reduce the third-harmonic content of the calculated damping and balancing term. A third-harmonic term can then be calculated on the basis of the inverter output voltage, and, finally, the third-harmonic term can be added to the damping and balancing term.

FIG. 1 illustrates an arrangement including a three-phase, three-level inverter and an output LCL-filter connecting the inverter to a grid in accordance with an exemplary embodiment of the present disclosure. FIG. 1 illustrates an exemplary arrangement including a three-phase, three-level inverter 11 and an output LCL-filter 12 connecting the inverter to a three-phase grid 13. The inverter 11 is supplied by a power source 15 and includes (e.g., comprises) a DC-link 14 with a neutral point m.

In FIG. 1, the power source 15 is a photovoltaic (PV) panel array and the DC-link is constructed of two capacitors $C_1$ and $C_2$. Voltages $v_{C1}$ and $v_{C2}$ are measured over capacitors $C_1$ and $C_2$, respectively. Thus, voltages $v_{C1}$ and $v_{C2}$ represent voltages over a top half and a bottom half of the DC-link in FIG. 1. Voltage $v_{PV}$ represents the voltage over the PV panel array 15 and $i_{PV}$ is the current produced by the panel array 15.

An inverter bridge 16 of the inverter 11 is represented by three-state switches $S_a$, $S_b$, and $S_c$ with switching sequences $u_a$, $u_b$, and $u_c$, respectively. By operating the switches $S_a$, $S_b$, and $S_c$, the inverter bridge 16 produces three phase voltages $e_a$ to $e_c$, which are then supplied to the grid 13 through the LCL-filter 12. The LCL-filter 12 includes three inverter-side inductors $L_1$, three capacitors C, and three grid-side inductors $L_0$. $i_{0a}$ to $i_{0c}$ represent grid-side phase currents, $i_{1a}$ to $i_{1c}$ represent inverter-side phase currents, and $v_{C0a}$ to $v_{C0c}$ represent capacitor voltages of the LCL-filter 12. The three-phase grid 13 in FIG. 1 is represented by three voltages $v_{Sa}$, $v_{Sb}$, and $v_{Sc}$.

The arrangement further includes a virtual-ground connection between a star-point l of the LCL-filter 12 and the neutral point m of the DC-link 14. Current $i_m$ is a circulatory current in the virtual-ground connection. The virtual-ground connection creates a path where high frequency harmonic components, mainly due to switching, can circulate. This can reduce the leakage currents considerably. In FIG. 1, the ground connection n is used to fix a reference of a zero potential. That is, there is no fourth wire in the connection between the inverter 11 and the grid 13, and thus, no or negligible circulation of zero-sequence current towards the ground connection n.

The exemplary arrangement of FIG. 1 is an equivalent generic representation of a three-level inverter, such as a three-level neutral-point-clamped (NPC) inverter as described in document [19], or a three-level hybrid inverter to which a VG connection has been added to cope with the CMV as described in documents [19], [20]. A hybrid converter topology with VG connection described in document [15] can also be described using the equivalent circuit of FIG. 1. Therefore, results shown in this disclosure apply at least to these families of three-level inverters. Though the exemplary arrangement of FIG. 1 illustrates a three-level inverter 11, exemplary embodiments of the present disclosure are not restricted to three-level inverters. The inverter can also produce more voltage levels not specified herein.

An exemplary controller (e.g., processor) design for the arrangement of FIG. 1 can, for instance, be based on the averaged version of the system model. Average modelling of the three-level NPC has been studied in detail in document [21]. Assuming that a switching frequency of the switches $S_a$, $S_b$, and $S_c$ frequency is sufficiently high, a phase modulation index vector $\delta_{abc}=[\delta_a \delta_b \delta_c]^T$ can be used to represent switching sequences $u_a$, $u_b$, and $u_c$ of the switches in the model equations. Thus, the dynamics of the circuit in FIG. 1 can be described through an average mathematical model.

The phase variables of FIG. 1 can be transformed to αβγ-coordinates, where the α-component and the β-component form a vector in a stationary reference frame, and the γ-coordinate represents a zero-sequence component. This permits highlighting structural properties that can be exploited in the controller design. Phase voltage and current vectors can be transformed to the fixed-frame αβγ-coordinates by using a normalized Clarke's transformation matrix T:

$$x_{\alpha\beta\gamma} = \begin{bmatrix} x_\alpha \\ x_\beta \\ x_\gamma \end{bmatrix} = Tx_{abc} = \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \\ \frac{1}{\sqrt{2}} & \frac{1}{\sqrt{2}} & \frac{1}{\sqrt{2}} \end{bmatrix} \begin{bmatrix} x_a \\ x_b \\ x_c \end{bmatrix}, \quad (1)$$

where $x_{\alpha\beta\gamma}$ is a αβγ-coordinate representation of a phase variable vector $x_{abc}$.

Throughout this disclosure, bold type face characters are used to represent either vectors or matrices, while normal type face characters represent scalars. Components of αβγ-coordinate vector representations are denoted with subscripts α, β, and γ, while phase variables are represented with subscripts a, b, and c.

The model can be split into two subsystems in order to facilitate the controller design. The first subsystem can involve a description of mainly the α-component and the β-component of αβγ-coordinate-transformed LCL-filter 12 signals with a sum of the DC-link 14 capacitor voltages as follows:

$$L_0 \frac{d}{dt} i_{0\alpha\beta} = v_{C0\alpha\beta} - v_{S\alpha\beta}, \quad (2)$$

$$C_0 \frac{d}{dt} v_{C0\alpha\beta} = i_{1\alpha\beta} - i_{0\alpha\beta}, \quad (3)$$

$$L_1 \frac{d}{dt} i_{1\alpha\beta} = e_{\alpha\beta} - v_{C0\alpha\beta}, \quad (4)$$

$$C \frac{d}{dt}(v_{C1} + v_{C2}) = 2i_{PV} - \delta_{\alpha\beta}^T i_{1\alpha\beta} - \delta_\gamma i_{1\gamma}, \quad (5)$$

where $i_{0\alpha\beta}=[i_{0\alpha} i_{0\beta}]^T$, $i_{1\alpha\beta}=[i_{1\alpha} i_{1\beta}]^T$ are the grid-side current vector and the inverter-side current vector of the LCL-filter 12, respectively. Voltage $v_{C0\alpha\beta}=[v_{C0\alpha} v_{C0\beta}]^T$ is the capacitor voltage vector of the LCL-filter 12, $v_{S\alpha\beta}=[v_{S\alpha} v_{S\beta}]^T$ is the grid voltage vector; and $L_0$, $C_0$, $L_1$ are inductances and a capacitance of the LCL-filter 12, $e_{\alpha\beta}=[e_\alpha e_\beta]^T$ is a voltage the inverter injects to the LCL-filter 12; $\delta_{\alpha\beta}=[\delta_\alpha \delta_\beta]^T$ is a modulation index vector, and $\delta_\gamma$ is a zero-sequence component of the modulation index vector. Current $i_\gamma$ represents a zero-sequence component of LCL-filter 12 inverter-side current. Both capacitances in the DC-link 14 are assumed to have the same value, that is, $C_1=C_2=C$.

The first subsystem can be simplified by using a sum $x_1=v_{C1}+v_{C2}$ and a difference $x_2=v_{C1}-v_{C2}$ of the DC-link 14 capacitor voltages as new variables for describing the dynamics of the capacitor voltages. The vector $e_{\alpha\beta}$ can be defined using the modulation index vector $\delta_{\alpha\beta}$, for instance, as follows:

$$e_{\alpha\beta} = \frac{x_1}{2}\delta_{\alpha\beta} + \frac{x_2}{2\sqrt{3}}\begin{bmatrix} \frac{\delta_\alpha^2 - \delta_\beta^2}{\sqrt{2}} - 2\delta_\alpha\delta_\gamma \\ \sqrt{2}\,\delta_\alpha\delta_\beta - 2\delta_\beta\delta_\gamma \end{bmatrix} \quad (6)$$

The vector $e_{\alpha\beta}$ can be taken as an actual control input of the subsystem described by Equations (2) to (5) instead of the modulation index vector $\delta_{\alpha\beta}$.

In the arrangement of FIG. 1, the control objective of a controller for the first subsystem can, for instance, be twofold. First, the controller can be provided with a first loop which guarantees regulation of the sum $x_1$ of the DC-link capacitor voltages towards a voltage reference $x_1^*$. In FIG. 1, the voltage reference $x_1^*$ can, for instance, be fixed by a maximum power point tracking (MPPT) method. Ideally, the sum $x_1$ should remain at a voltage of a maximum power point (MPP), e.g., $x_1^*=v_{MPP}$.

Second, the controller can be provided with a second loop which guarantees tracking of the grid-side current $i_{0\alpha\beta}$ towards a reference vector $i_{0\alpha\beta}^*$ which can, for instance, be computed according to $$i_{0\alpha\beta}^* = \frac{P_{DC}}{3v_{S,RMS}^2}v_{S\alpha\beta,p}^1, \quad (7)$$

where $v_{S,RMS}$ is an RMS value of the grid voltage, and $v_{S\alpha\beta,p}^1$ is a positive-sequence fundamental component of the grid voltage $v_{S\alpha\beta}$, which in the balanced and non-distorted case is $\|v_{S\alpha\beta}\|=\sqrt{3}v_{S,RMS}$. A power reference $P_{DC}$ is an amplitude which can, for instance, be determined by a PI controller in the voltage loop. The power $P_{DC}$ can be based on a power $p_{PV}$ extracted from the PV panel, where $p_{PV}$ can be defined as $$p_{PV}=i_{PV}x_1. \quad (8)$$

Additionally, the controller for the first subsystem can attenuate resonance at the resonance frequency of the LCL-filter 12. This attenuation method can, for instance, use a similar approach as disclosed in documents [16]-[18].

The controller for the first subsystem can, for instance, use a similar approach as in a model of a known two-level converter as disclosed in document [23], except for additional terms which can be considered as disturbances.

Design of the controller for the first subsystem is not discussed in more detail in this disclosure. It is assumed that a suitable controller for the first subsystem exists and guarantees the specified voltage regulation and current tracking. That is, it is assumed that:

$$i_{0\alpha\beta} \cong i_{0\alpha\beta}^* = \frac{P_{DC}}{3v_{S,RMS}^2}v_{S\alpha\beta,p}^1, \quad (9)$$

$$i_{1\alpha\beta} \cong i_{1\alpha\beta}^* = C_0\frac{d}{dt}v_{C0\alpha\beta}^* + i_{0\alpha\beta}^*, \quad (10)$$

$$v_{C0\alpha\beta} \cong v_{C0\alpha\beta}^* = L_0\frac{d}{dt}i_{0\alpha\beta}^* + v_{S\alpha\beta}, \quad (11)$$

$$e_{\alpha\beta}^* \cong L_1\frac{d}{dt}i_{1\alpha\beta}^* + v_{C0\alpha\beta}^*, \quad (12)$$

and that $x_1$ is a positive variable, bounded away from zero and slowly varying. Assuming that $$v_{S\alpha\beta}^T v_{S\alpha\beta} \cong 3v_{S,RMS}^2, \quad (13)$$

$$\delta_{\alpha\beta} \cong \delta_{\alpha\beta}^* = \frac{2e_{\alpha\beta}^*}{x_1}, \quad (14)$$

the following expression can be produced on the basis of Equations (9) to (12):

$$\delta_{\alpha\beta}^T i_{1\alpha\beta} = \frac{2}{x_1}(P_{DC} + \phi_{2\omega}), \quad (15)$$

where $\phi_{2\omega}$ is mainly composed of second order harmonics and can be given by:

$$\phi_{2\omega} = L_1\left(\frac{d}{dt}i_{1\alpha\beta}^*\right)^T i_{1\alpha\beta}^* + C_0\left(\frac{d}{dt}v_{C0\alpha\beta}^*\right)^T v_{C0\alpha\beta}^* + L_0\left(\frac{d}{dt}i_{0\alpha\beta}^*\right)^T i_{0\alpha\beta}^*. \quad (16)$$

Under balanced operation, term $\phi_{2\omega}$ vanishes.

In order to facilitate damping of LCL-filter zero-sequence components of the LCL-filter 12 and balancing of the DC-link 14 voltages, a second subsystem of the model can be formed. The second subsystem can contain a zero-sequence component model of the LCL-filter 12. The second subsystem can, for instance, be represented by the $\gamma$-coordinate (zero-sequence) components of the LCL-filter signals and the difference $x_2$ of capacitor voltages:

$$C_0\frac{d}{dt}v_{C0\gamma} = i_{1\gamma}, \quad (17)$$

$$L_1\frac{d}{dt}i_{1\gamma} = \frac{x_1}{2}\delta_\gamma + \frac{x_2}{2\sqrt{3}}(\delta_\alpha^2+\delta_\beta^2+\delta_\gamma^2) - v_{C0\gamma}, \quad (18)$$

$$C\frac{d}{dt}x_2 = -\frac{2}{\sqrt{3}}(\delta_{\alpha\beta}^T i_{1\alpha\beta})\delta_\gamma - \\ \frac{1}{\sqrt{6}}[\,\delta_\alpha^2 - \delta_\beta^2 \quad -2\delta_\alpha\delta_\beta\,]i_{1\alpha\beta} - \frac{1}{\sqrt{3}}(\delta_\alpha^2+\delta_\beta^2+\delta_\gamma^2)i_{1\gamma}, \quad (19)$$

where $v_{C0\gamma}$ and $i_{1\gamma}$ are the zero-sequence components of the capacitor voltage and the inverter-side current of the LCL-filter 12, respectively. $\delta_\gamma$ is a zero-sequence component of the duty ratio.

On the grid side, there is a normal three-wire connection, and thus, a zero component $i_{0\gamma}$ of the grid-side current is zero. The zero-sequence component $i_{1\gamma}$ of the LCL-filter inverter-side current can be determined on the basis of the current $i_m$ flowing in the virtual-ground connection wire:

$$i_{1\gamma} = \sqrt{3} i_m, \quad (20)$$

while the zero-sequence component of the LCL-filter capacitor voltage $v_{C0\gamma}$ can be determined on the basis of a voltage $v_{mn}$ between the DC-link neutral point connection m and the ground neutral point n:

$$v_{C0\gamma} = \sqrt{3} v_{mn}. \quad (21)$$

A controller for the second subsystem represented by Equations 17 to 19 can be formed by using the zero-sequence component $\delta_\gamma$ of the duty ratio vector as the actual control input. A control objective of the controller for the second subsystem of the model can also be twofold. First, the controller injects a specified damping to guarantee stability on all variables in the second subsystem. Second, the controller for the second subsystem guarantees a balance between the DC-link capacitor voltages. That is, the controller for the second subsystem regulates an average of the voltage difference $x_2$ towards zero.

The second subsystem, represented by Equations (15) to (17), can be rewritten into the following matrix form:

$$\begin{bmatrix} C_0 & 0 & 0 \\ 0 & L_1 & 0 \\ 0 & 0 & \frac{C}{2} \end{bmatrix} \begin{bmatrix} \frac{d}{dt} v_{C0\gamma} \\ \frac{d}{dt} i_{1\gamma} \\ \frac{d}{dt} x_2 \end{bmatrix} = \quad (22)$$

$$\begin{bmatrix} C_0 & 1 & 0 \\ -1 & 0 & \frac{k+\delta_\gamma^2}{2\sqrt{3}} \\ 0 & \frac{k+\delta_\gamma^2}{2\sqrt{3}} & 0 \end{bmatrix} \begin{bmatrix} v_{C0\gamma} \\ i_{1\gamma} \\ x_2 \end{bmatrix} + \begin{bmatrix} 0 \\ \frac{x_1}{2} \\ \frac{2P_{DC}}{\sqrt{3} x_1} \end{bmatrix} \delta_\gamma + \begin{bmatrix} 0 \\ 0 \\ \frac{\phi_{3\omega}}{2} \end{bmatrix},$$

where $$\delta_\alpha^2 + \delta_\beta^2 = k, \, k > 0, \quad (23)$$

which is a term acting only in the interconnection matrix, and is not used for control purposes. The term $\phi_{3\omega}$ is mainly composed of third order harmonics and can be given by $$\phi_{3\omega} = \frac{1}{\sqrt{6}} [\, \delta_\alpha^2 - \delta_\beta^2 \quad -2\delta_\alpha \delta_\beta \,] i^*_{1\alpha\beta}. \quad (24)$$

These third order harmonics are inherent to the selected three-phase three-level topology and can propagate to all state variables in the subsystem of Equation (22), for example, to the zero-sequence duty-cycle component $\delta_\gamma$, and thus to the zero-sequence component $e_\gamma$ of the injected voltage.

The second subsystem in Equation (22) does not contain natural damping. Notice that, the uncontrolled system, where $\delta_\gamma=0$, is a simple integrator plus resonant filter system, which is perturbed by a third order harmonic. In order to facilitate a control design for the second subsystem, the effect of this third-harmonic can be neglected. In other words, the term $\phi_{3\omega}$ can be neglected.

The control design can, for instance, follow the Lyapunov approach. For this, the following energy storage function H can be formed as follows:

$$H = [\, v_{C0\gamma} \quad i_{1\gamma} \quad x_2 \,] \begin{bmatrix} C_0 & 0 & 0 \\ 0 & L_1 & 0 \\ 0 & 0 & \frac{C}{2} \end{bmatrix} \begin{bmatrix} v_{C0\gamma} \\ i_{1\gamma} \\ x_2 \end{bmatrix} \quad (25)$$

A time derivative of the function H along trajectories of Equation (22) disregarding term $\phi_{3\omega}$ is $$\frac{d}{dt} H = \left( x_1 i_{1\gamma} - \frac{4P_{DC}}{\sqrt{3} \, x_1} x_2 \right) \delta_\gamma, \quad (26)$$

which can made negative semi-definite by selecting $$\delta_\gamma = -R_d \left( x_1 i_{1\gamma} - \frac{4P_{DC}}{\sqrt{3} \, x_1} x_2 \right), \quad (27)$$

where $R_d$ is a design coefficient. A sketch of the proof is described next.

$$\frac{d}{dt} H \equiv 0 \text{ for } i_{1\gamma} = \frac{4P_{DC}}{\sqrt{3 x_1^2}} x_2$$

which is equivalent for having $\delta_\gamma=0$. Then, from Equation (22), $x_2$ and $i_{1\gamma}$ go asymptotically to zero. Thus, $$\frac{d}{dt} v_{C0\gamma}$$

goes to zero. That is, $v_{C0\gamma}$ goes to a constant, and $$\frac{d}{dt} i_{1\gamma}$$

goes to a constant as well. As $i_{1\gamma}$ goes to zero, $$\frac{d}{dt} i_{1\gamma}$$

should go to zero as well. Out of which, $v_{C0\gamma}$ also goes to zero.

In FIG. 1, when an injected voltage is used as the controller for the first subsystem, e.g., an output voltage of the inverter 11 is controlled on the basis of a voltage reference vector $e_{\alpha\beta}^*$ representing the voltage $e_{\alpha\beta}$ to be injected, it can be convenient to build a zero-sequence damping and balancing voltage term $e_\gamma^*$ out of $\delta_\gamma$.

The zero-sequence damping and balancing voltage term $e_\gamma^*$ can, for instance, be calculated on the basis of the LCL-filter inverter-side current zero-sequence component, the DC-link top and bottom half voltages:

$$e_\gamma^* = x_1\delta_\gamma = -R_d\left(x_1^2 i_{1\gamma} - \frac{4P_{DC}}{\sqrt{3}}x_2\right). \quad (28)$$

Based on the structure of the above controller, it is also possible to propose a controller of the form $$e_\gamma^* = -R_{d1}i_{1\gamma} + R_{d2}x_2, \quad (29)$$

where $R_{d1}$ and $R_{d2}$ are design coefficients. Although only simple proportional terms have been proposed in (28) and (29), a more involved controller can be used to guarantee the same objectives. The controller can, for instance, include an integral term. The controller can, for instance, be a PI-controller.

Figure 2:
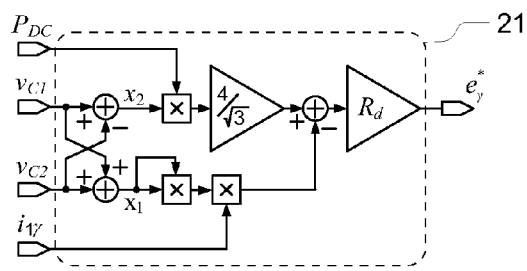
FIG. 2 illustrates a block diagram of a controller implementation for producing zero-sequence damping and balancing voltage term in accordance with an exemplary embodiment of the present disclosure.

FIG. 2 illustrates a block diagram of a controller implementation for producing zero-sequence damping and balancing voltage term in accordance with an exemplary embodiment of the present disclosure. As shown in FIG. 2, the zero-sequence damping and voltage balancing term $e_\gamma^*$ is formed by using a controller 21 according to Equation (28).

The zero-sequence damping and balancing voltage term $e_\gamma^*$ can then be appended to the voltage reference vector $e_{\alpha\beta}^*$, thus, creating a compensating voltage reference vector $$e_{\alpha\beta\gamma}^* = [\,(e_{\alpha\beta}^*)^T \quad e_\gamma^*\,]^T.$$

The control scheme given by Equations (22) and (28) actively injects a specified damping, and, thus, guarantees stability of the overall system composed by the zero-sequence component and the voltage difference.

In addition, the same control scheme can guarantee voltage balance, e.g., it drives the capacitor voltage difference to zero. However, the above mentioned results can only be guaranteed in average, as the system is perturbed by higher order harmonics, mainly a third-harmonic of the fundamental frequency. This third-harmonic disturbance can propagate in all state variables as well as in a controller producing the zero-sequence damping and balancing voltage term $e_\gamma^*$. The third-harmonic disturbance can create also other higher harmonics such as, for instance, the 6th harmonic.

The compensating voltage reference vector $e_{\alpha\beta\gamma}^*$ can be directly used as a reference for a modulation algorithm. Alternatively, a phase voltage references $e_{abc}^* = [e_a^* e_b^* e_c^*]^T$ for the injected phase voltages can easily be obtained by applying an inverse of Clarke's transformation to the vector $e_{\alpha\beta\gamma}^*$. The resulting phase voltage references $e_{abc}^*$ can be used as a reference for a modulation algorithm.

The virtual-ground connection can be utilized for minimizing leakage currents, for instance, in terminals of the PV panels 15 in the arrangement of FIG. 1. The leakage currents can be related with common-mode voltage issues. In addition, the virtual-ground connection allows a better use of the DC-link voltage. In document [14], the range of the modulation index is extended 15% above the modulation index obtained with a normal four-wire connection.

In FIG. 1, the virtual-ground connection does not extend to the grid 13, and, thus, a third-harmonic reference injection method can be used to gain this benefit, e.g., a third-harmonic term can intentionally be added to the damping and balancing term. As a result, the voltage in the DC-link can be substantially reduced, which can represent an improvement in efficiency, as the switching devices will be stressed now by a lower voltage.

However, as mentioned above, the controller producing the zero-sequence damping and balancing voltage term $e_\gamma^*$ is already perturbed with a natural disturbance mainly containing a third-harmonic component. This third-harmonic component can have a different phase shift and amplitude compared with a desired third-harmonic signal designed according to a third-harmonic reference injection method.

Figure 3:
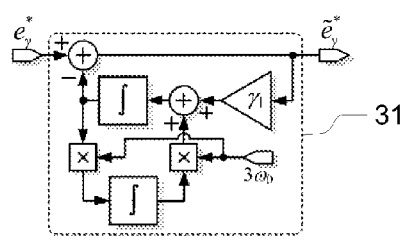
FIG. 3 illustrates a notch filter tuned at the third harmonic in accordance with an exemplary embodiment of the present disclosure.

Therefore, it can be specified to reduce the third-harmonic content of the damping and balancing term before applying the third-harmonic reference injection method. FIG. 3 illustrates a notch filter tuned at the third harmonic in accordance with an exemplary embodiment of the present disclosure. As shown in FIG. 3, a notch filter 31 tuned at the third harmonic $3\omega_0$ can be used for this purpose. A filtered damping and balancing voltage term $\tilde{e}_\gamma^*$ is obtained from the notch filter 31. $\tilde{e}_\gamma^*$ is free of such a third-harmonic disturbance. This can, however, be an optional procedure as the effect of this natural third harmonic component can be negligible under normal operation conditions.

In FIG. 1, the third-harmonic injection method then includes a step of adding a third-harmonic term $e_{3rd}$ to the damping and balancing term, wherein the third harmonic term $e_{3rd}$ has a frequency of three times the fundamental frequency of $e_{\alpha\beta}^*$, is synchronized with $e_{\alpha\beta}^*$, and has an amplitude of one sixth of the amplitude of the fundamental component of $e_{\alpha\beta}^*$.

Figure 4:
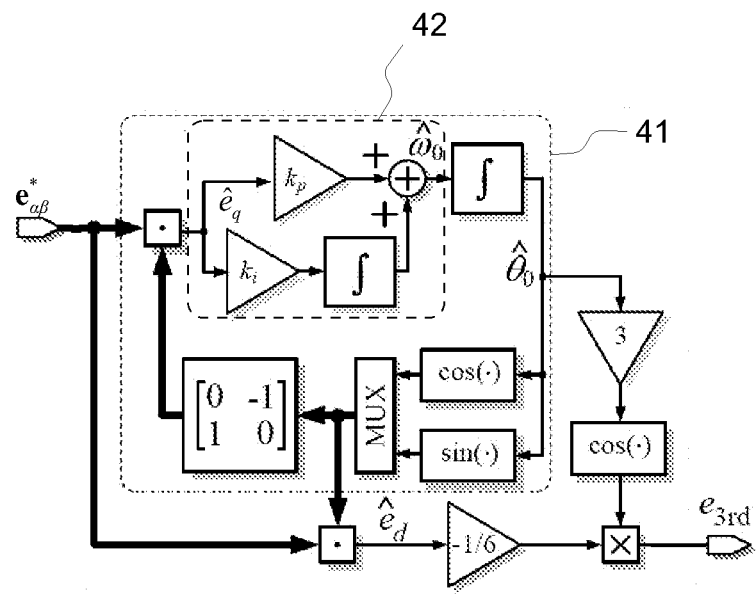
FIG. 4 illustrates means for computation of the third harmonic component in accordance with an exemplary embodiment of the present disclosure.

FIG. 4 illustrates means, such as a processor, for computation of the third harmonic component in accordance with an exemplary embodiment of the present disclosure. As shown in FIG. 4, the signal $e_{\alpha\beta}^*$ is delivered to a synchronous-reference frame PLL (SRFPLL) 41 [22]. The SRF-PLL 41 is based on a dq-transformation of the rotating input vector, and it reconstructs the amplitude of $e_{\alpha\beta}^*$, a fundamental frequency $\omega_0$, a phase angle $\mu_0$, and synchronizes a normalized sinusoidal vector $[\cos(\mu_0)\ \sin(\mu_0)]^T$ with the rotating input vector, in this case $e_{\alpha\beta}^*$.

Synchronization can be achieved when the q-component reaches zero, while the d-component gives the amplitude of the input vector. The SRF-PLL 41 uses a PI controller 42 operating on the q-component in order to reconstruct the fundamental frequency $\hat{\omega}_0$. The fundamental frequency $\hat{\omega}_0$ is, in turn, integrated in order to reconstruct the phase angle $\hat{\theta}_0$. The phase angle $\hat{\theta}_0$ is multiplied by three and fed to a cosine function in order to generate a cosine signal synchronized with $e_{\alpha\beta}^*$ a frequency $3\omega_0$. The resulting signal is multiplied by $-\frac{1}{6}$ of the amplitude $\hat{e}_d$, e.g., the d-component, of $e_{\alpha\beta}^*$ to finally get the desired signal $e_{3rd}$ to be injected, that is, $$e_{3rd} = -\frac{1}{6}\hat{e}_d \cos(3\hat{\theta}_0). \quad (30)$$

The SRF-PLL 41 in the exemplary arrangement of FIG. 1 is designed to operate properly under balanced and pure sinusoidal signals, e.g., without distortion. A more involved scheme can have to be used for unbalanced operation.

Figure 5:
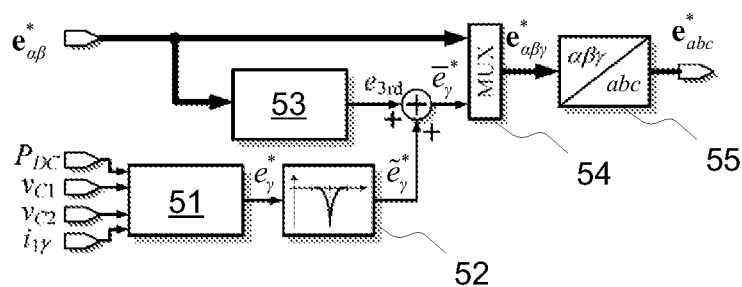
FIG. 5 illustrates a scheme of the overall zero-sequence damping and voltage balance controller in accordance with an exemplary embodiment of the present disclosure.

FIG. 5 illustrates a scheme of the overall zero-sequence damping and voltage balance controller in accordance with an exemplary embodiment of the present disclosure. A damping and balancing term $e_\gamma^*$ is calculated using a controller 51. The controller 51 can, for instance, be implemented as illustrated in FIG. 2. Optionally, the third-harmonic content of the damping and balancing term $e_\gamma^*$ can be cancelled out by using a notch filter 52. The notch filter 52 can, for instance, be implemented as illustrated in FIG. 3. A third harmonic term $e_{3rd}$ is calculated on the basis of an injected voltage reference $e_{\alpha\beta}^*$ in a third-harmonic calculation block 53. The third-harmonic calculation block 53 can, for instance, be implemented as illustrated in FIG. 4.

In FIG. 5, the third harmonic term $e_{3rd}$ is added to a clean signal $\tilde{e}_\gamma^*$ to form a final zero-sequence component of the control $\bar{e}_\gamma^*$, e.g., $$\bar{e}_\gamma^* = \tilde{e}_\gamma^* + e_{3rd}. \tag{31}$$

This signal $\bar{e}_\gamma$ is then incorporated to complete the control signal vector by using a multiplexer 54, e.g., $$e_{\alpha\beta\gamma}^* = \begin{bmatrix} e_{\alpha\beta}^* \\ e_\gamma^* \end{bmatrix}. \tag{32}$$

In FIG. 5, an inverse Clarke's transformation block 55 is used to obtain a phase voltage references $e_{abc}^*$, which can be used as the reference for a modulation scheme obtaining the switching sequences for the switching devices in the inverter bridge.

The exemplary method as disclosed was simulated by using a setup including a three-phase three-level inverter as illustrated in FIG. 1. The inverter was supplied by a PV panel and was connected to a grid through an LCL-filter. A virtual connection was built between a DC-link midpoint and a star point of the LCL-filter. Sinusoidal balanced line voltages with peak voltages of 325 V were used for the three-phase grid voltage, with a fundamental frequency $\omega_0$ of $100\pi$ rad/s (50 Hz).

On the DC side, the PV panel has been considered with the following parameters: the short circuit current $I_{SC}$=4.3816 A, the open circuit voltage $V_{OC}$=748 V and thermic voltage $V_T$=51.8162 V. Irradiation and temperature were assumed to be constant, having values 550 W/m² and of 25° C., respectively. Under these conditions, the point of maximum power (MPP) was located at $v_{MPP}$=615 V, which corresponded to an available maximum power of $p_{MPP}$=2487.9 W.

A suitable controller for the first subsystem was used to guarantee tracking of the grid side current $i_{o\alpha\beta}$ towards a desired reference $i_{o\alpha\beta}^*$ which was defined according Equation (7). According to Equation (7), the amplitude of the current reference $i_{o\alpha\beta}^*$ was fixed by a power reference $P_{DC}$. A value for $P_{DC}$ was obtained as an output of a PI controller regulating the sum $x_1$ of DC-link voltages towards a voltage reference $x_1^*$ fixed at the voltage of the MPP, e.g., $x_1^* = V_{MPP}$ 615 V.

In order to implement the disclosed method, a controller for the second subsystem was built according to FIGS. 2 to 5. The following parameters were used for the controller: $R_d$=0.001, $\gamma_1$=50, $k_p$=20 and $k_i$=500.

The setup was simulated in a first simulation including four stages. At the start-up, from time t=0 s to t=1 s, the voltage regulation loop, the notch filter, and the 3rd-harmonic reference injection were disabled. Only the damping and voltage balance control scheme was enabled from the very beginning and all along the test to avoid any resonance or instability. During the period of t=0 s to 1 s, the power reference was fixed to $P_{DC}$=0. Hence, the amplitude for the current reference $i_{o\alpha\beta}^*$ was zero, that is, there was no injection of power to the grid, nor power was extracted from the PV panel. During this period, the sum $x_1$ of capacitor voltages was maintained at the open circuit voltage $V_{OC}$, with zero PV current. The initial condition for a voltage difference $x_2$ between the DC-link capacitor voltages was set to 1 V, and was maintained at this value during the period, as $P_{DC}$=0.

At t=1 s, the voltage regulation loop controlling the sum $x_1$ towards the MPP voltage was enabled. As a result, $P_{DC}\ne0$, and, thus, the inverter started to inject power to the grid.

At t=2 s, the notch filter was enabled. This eliminated the 3rd harmonic from the zero-sequence component of the controller $e_\gamma^*$, thus, generating $\tilde{e}_\gamma^*$.

At t=3 s, the injection of the third-harmonic term $e_{3rd}$ was enabled, e.g., $\bar{e}_\gamma^* = \tilde{e}_\gamma^* + e_{3rd}$, which basically reduced the modulation index.

The second subsystem controller according to the exemplary embodiments of the disclosed method maintained signals $x_2$, $i_{1\gamma}$ and $v_{Co\gamma}$ bounded, stable and close to zero (in average). However, the signals exhibited a persistent ripple at the third harmonic. This ripple was somewhat reduced with the addition of the notch filter. However, the ripple grew again after the third-harmonic reference injection was enabled.

Figure 6A:
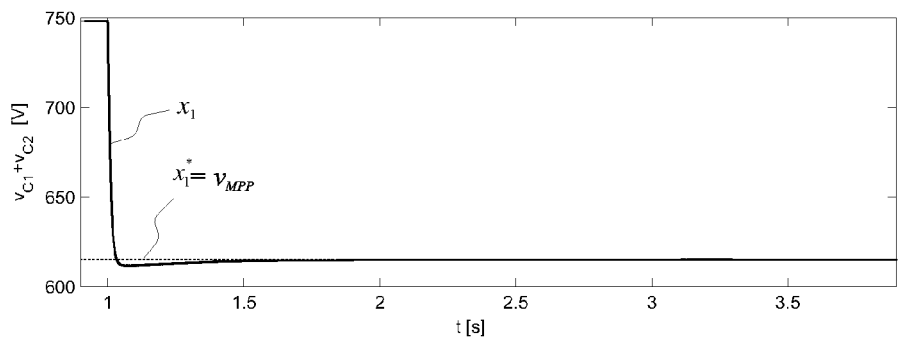
FIGS. 6a and 6b illustrate transient responses of the sum and difference of the DC-link capacitor voltages during a first simulation in accordance with an exemplary embodiment of the present disclosure.
Figure 6B:
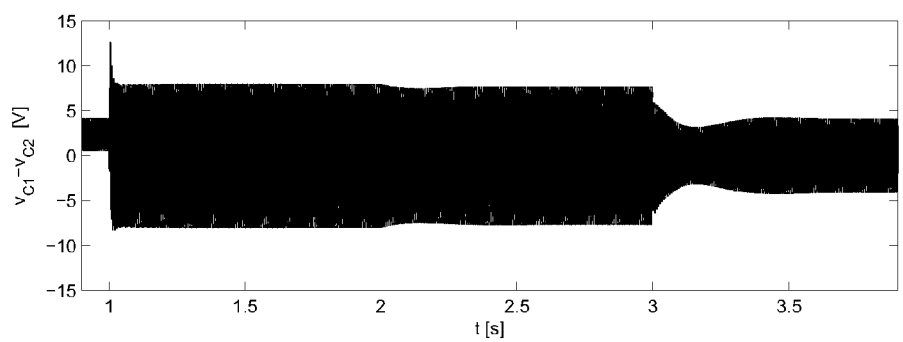

FIGS. 6a and 6b illustrate transient responses of the sum and difference of the DC-link capacitor voltages during a first simulation in accordance with an exemplary embodiment of the present disclosure. FIG. 6a shows the sum $x_1$ of capacitors voltages, starting at $V_{OC}$=748 V, and reaching its reference at 615 V after a relatively small transient. FIG. 6b illustrates the voltage difference $x_2$ having a ripple oscillating around the origin. Regulation of the voltage difference $x_2$ to zero was guaranteed in average. The oscillation, mainly a third harmonic, decreased after the notch filter was enabled at t=2 s, and decreased even more after the third-harmonic reference injection was enabled at t=3 s.

Figure 7A:
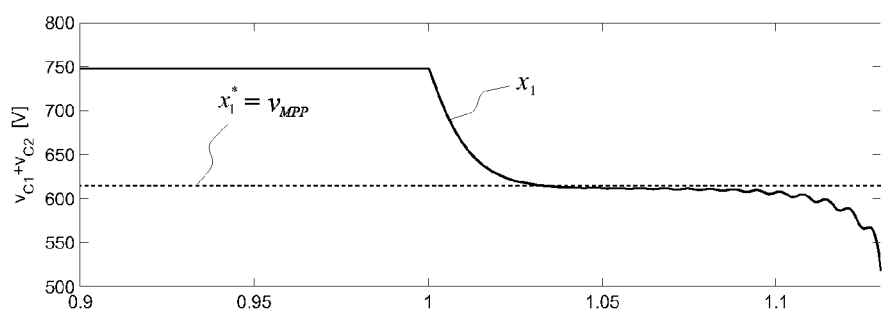
FIGS. 7a and 7b illustrate transient responses of the sum and the difference of DC link voltages in a second simulation where the damping and voltage balance control scheme were not enabled in accordance with an exemplary embodiment of the present disclosure.
Figure 7B:
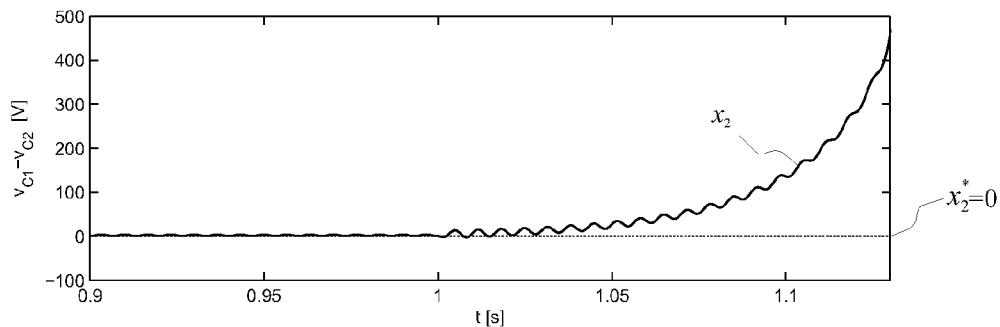

As a comparison, instabilities could be observed in a second simulation where the damping and voltage balance control scheme was not enabled. FIGS. 7a and 7b illustrate transient responses of the sum and the difference of DC link voltages in a second simulation where the damping and voltage balance control scheme were not enabled in accordance with an exemplary embodiment of the present disclosure. FIGS. 7a and 7b demonstrate these instabilities where the sum and the difference in voltages went unstable after enabling the voltage regulation loop at t=1 s. FIG. 7a illustrates the sum $x_1$ of capacitors voltages. FIG. 7b illustrates the voltage difference $x_2$.

Figure 8A:
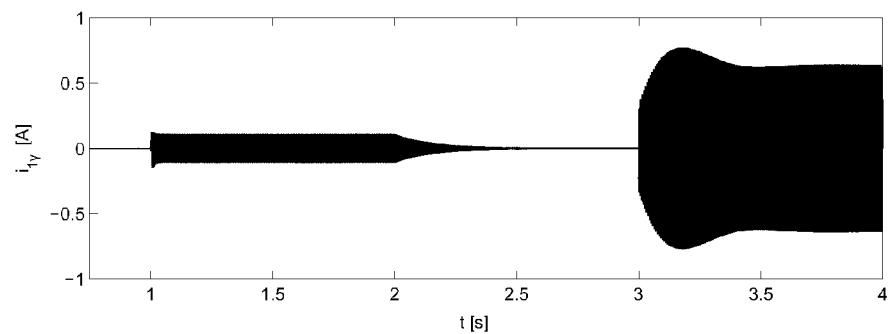
FIGS. 8a and 8b illustrate transient responses of a zero-sequence component of inverter-side inductor current and a zero-sequence component of capacitor voltage of the LCL filter during the first simulation in accordance with an exemplary embodiment of the present disclosure.
Figure 8B:
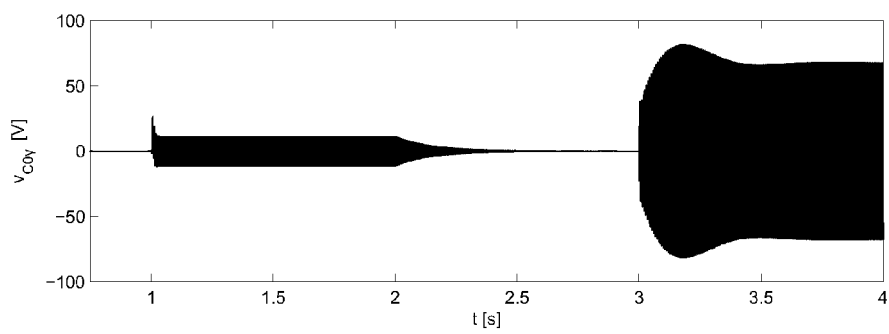

FIGS. 8a and 8b illustrate transient responses of a zero-sequence component of inverter-side inductor current and a zero-sequence component of capacitor voltage of the LCL filter during the first simulation in accordance with an exemplary embodiment of the present disclosure. FIG. 8a shows the zero-sequence component of inverter-side inductor current $i_{1\gamma}$ during the first simulation. FIG. 8b shows zero-sequence component of capacitor voltage $v_{Co\gamma}$ of the LCL filter during the simulation. It can be observed that the ripple, mainly at the third harmonic, diminished with the introduction of the notch filter. The ripple grew considerably after injection of the third harmonic to the zero sequence component.

Figure 9A:
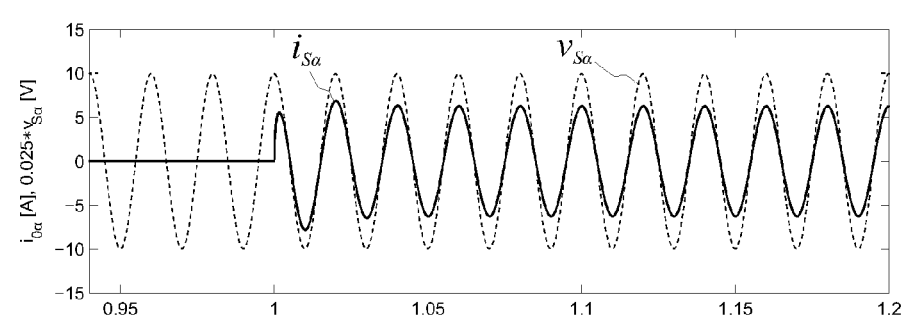
FIGS. 9a and 9b illustrate phase voltage generation on the basis of the disclosed method in accordance with an exemplary embodiment of the present disclosure.
Figure 9B:
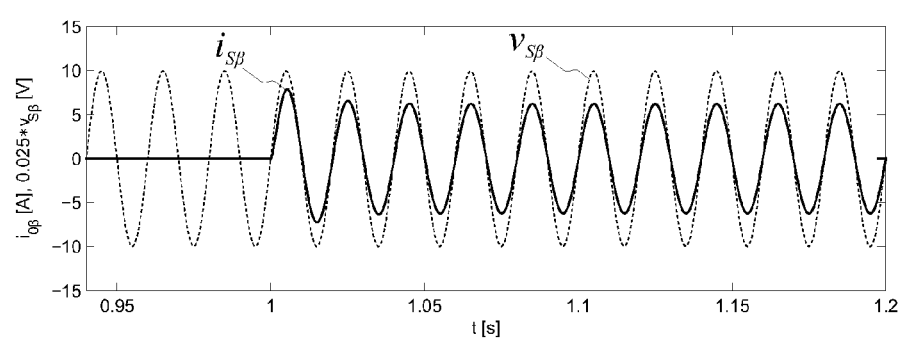

In the first simulation, the grid side currents were sinusoidal signals synchronized with the grid voltage signals, thus guaranteeing a PF close to one. In fact, they reached their corresponding references in an arbitrarily short time. This can be seen in FIGS. 9a and 9b. FIGS. 9a and 9b illustrate phase voltage generation on the basis of the disclosed method in accordance with an exemplary embodiment of the present disclosure. FIG. 9a illustrates the α-component of the grid side current $i_{o\alpha\beta}$ with respect to the α-component of the grid voltage $v_{S\alpha\beta}$. FIG. 9b illustrates the β-component of the grid side current $i_{o\alpha\beta}$ with respect to the β-component of the grid voltage $v_{S\alpha\beta}$. The currents preserved a same shape and phase all along the test. They were not affected by the modifications made to the zero-sequence component of the controller, namely the insertion of the notch filter and the third-harmonic reference injection method.

Figure 10A:
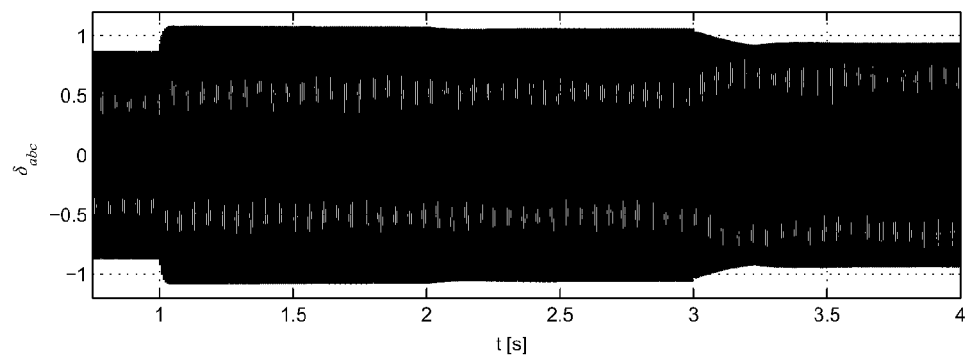
FIGS. 10a and 10b illustrate an effect of the third-harmonic injection in the first simulation of the present disclosure.
Figure 10B:
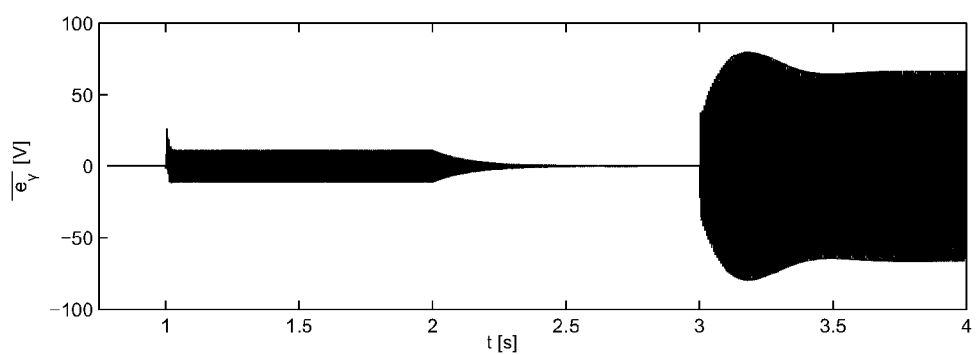

FIGS. 10a and 10b illustrate an effect of the third-harmonic injection in the first simulation of the present disclosure. As mentioned above, the peak voltage of each phase line voltage was fixed to 325 V. Thus, the voltage on the DC side, e.g., the sum $x_1$, was ideally above 2·325 V=650 V. However, the reference for the sum $x_1^*$ of voltages was fixed to 615 V, well below 650 V. As a consequence, amplitudes of the phase modulation indices $\delta_{abc}$ were bigger than one during the period t=1 s to t=3 s. However, the injection of the third-harmonic term $e_{3rd}$ to the zero-sequence component of the control vector $\bar{e}_\gamma^*$ provided a solution for this over-modulation issue.

FIG. 10a shows that the amplitudes of the modulation indices $\delta_{abc}$ are higher than one from the starting of the voltage regulation loop at t=1 s and until t=3 s. After the 3rd-harmonic reference injection was enabled at t=3 s, the amplitude of the modulation indices $\delta_{abc}$ shrunk to a value smaller than one.

FIG. 10b shows that after enabling the voltage regulation loop at t=1 s, a ripple of third harmonic grew in the zero sequence controller $\bar{e}_\gamma^*$. This third-harmonic ripple vanished after the notch filter was enabled at t=2 s. However, as a consequence of the injection of the third-harmonic term $e_{3rd}$, the ripple in $\bar{e}_\gamma^*$ grew again after t=3 s.

Having a modulation index above the unity can cause over-modulation issues, and therefore, these situations should be avoided in a real implementation. Here this abnormal situation was allowed in order to show the effect and benefits of the third-harmonic reference injection method.

Figure 11A:
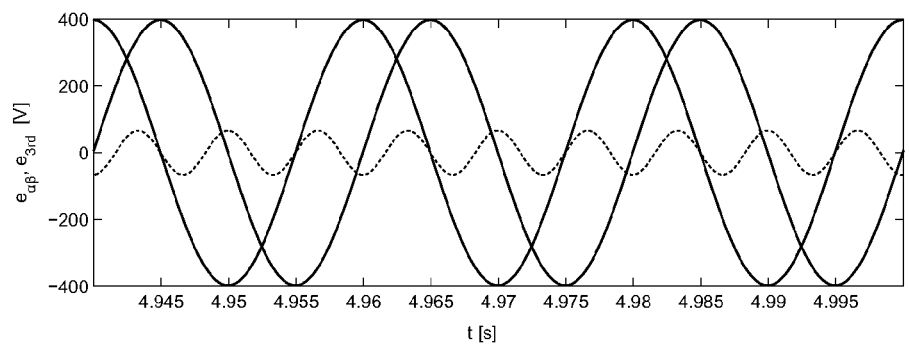
FIGS. 11a and 11b illustrate an example of constructing phase voltage references with the third-harmonic injection during the first simulation of the present disclosure.
Figure 11B:
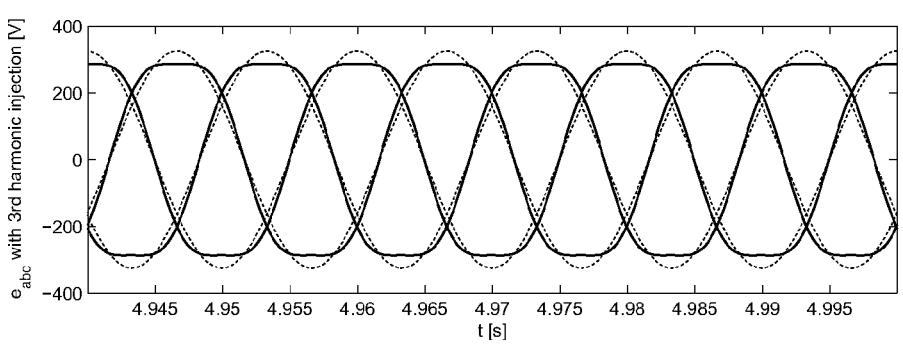

FIGS. 11a and 11b illustrate an example of constructing phase voltage references with the third-harmonic injection during the first simulation of the present disclosure. The phase voltage references were created according the controller of FIG. 5. FIG. 11a shows α- and β-coordinates of the reference (in solid line) $e_{\alpha\beta}^*$ and the third-harmonic term $e_{3rd}$ (in dashed line). FIG. 11b shows (in solid line) the flattened shapes of phase voltage references $e_{abc}^*$ comprising the added third-harmonic term $e_{3rd}$ and, for comparison, the original control signals (in dashed line) without third-harmonic reference injection.

Figure 12:
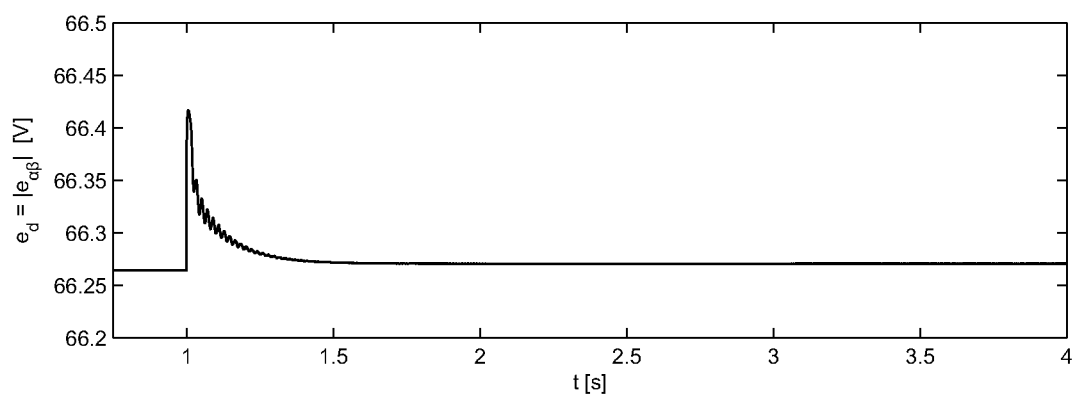
FIG. 12 illustrates a transient response of an SRF-PLL during the first simulation of the present disclosure.

FIG. 12 illustrates a transient response of an SRF-PLL during the first simulation of the present disclosure. FIG. 12 shows the amplitude of control vector $e_{\alpha\beta}^*$, e.g., the d-component out of the SRF-PLL 41 of FIG. 4 during the simulation. This amplitude showed a relatively small transient after enabling the voltage regulation loop at t=1 s, and was maintained constant in the rest of the test.

It will be obvious to a person skilled in the art that the novel concepts can be implemented in various ways. The disclosure and its embodiments are not limited to the examples described above but can vary within the scope of the claims.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCES

[1] M. Marchesoni, M. Mazzucchelli, F. V. P. Robinson and P. Tenca, "A minimum-energy-based capacitor voltage balancing control strategy for MPC conversion systems," in Proc. IEEE International Symposium on Industrial Electronics ISIE'99, 1999, Vol. 1, pp. 20-25.

[2] J. Pou, R. Pindado, D. Boroyevich, P. Rodriguez and J. Vicente, "Voltage-balancing strategies for diode-clamped multilevel converters," in IEEE 35th Annual Power Electronics Specialists Conference PESC'04, 2004 Vol. 5, 20-25 Jun. 2004, pp. 3988-3993.

[3] H. A. Hotait, A. M. Massoud, S. J. Finney and B. W. Williams, "Capacitor Voltage Balancing Using Redundant States for Five-Level Multilevel Inverter," in Proc. 7th International Conference on Power Electronics and Drive Systems PEDS '07, 2007, pp. 1062-1068

[4] D. W. Kang, C. S. Ma, T. J. Kim and D. S. Hyun, "Simple control strategy for balancing the DC-link voltage of neutral-point-clamped inverter at low modulation index," IEE Proceedings—Electric Power Applications, Vol. 151(5), pp. 569-575, 2004.

[5] S. Wei, N. Zargari, B. Wu and S. Rizzo, "Comparison and mitigation of common mode voltage in power converter topologies," in Proc. IEEE 39th Annual Meeting Industry Applications Conference IAS'04, 2004, Vol. 3, pp. 1852-1857.

[6] M. C. Cavalcanti, K. C. de Oliveira, A. M. de Farias, F. A. S. Neves, G. M. S. Azevedo and F. C. Camboim, "Modulation Techniques to Eliminate Leakage Currents in Transformerless Three-Phase Photovoltaic Systems," IEEE Trans. on Industrial Electronics, Vol. 57(4), pp. 1360-1368, April 2010.

[7] T. Kerekes, M. Liserre, R. Teodorescu, C. Klumpner and M. Sumner, "Evaluation of Three-Phase Transformerless Photovoltaic Inverter Topologies," IEEE Trans. on Power Electronics, Vol. 24(9), pp. 2202-2211, September 2009.

[8] H. Zhang, A. Von Jouanne, D. Shaoan, A. K. Wallace and F. Wang, "Multilevel inverter modulation schemes to eliminate common-mode voltages," IEEE Trans. on Industry Appl., Vol. 36(6), pp. 1645-1653, November/December 2000.

[9] R. M. Cuzner, A. R. Bendre, P. J. Faill, B. Semenov, "Implementation of a Four Pole Neutral-Point Clamped Three Phase Inverter with Low Common Mode Voltage Output," IEEE 42nd Annual Meeting Industry Applications Conference IAS'07, 2007, pp. 923-930.

[10] A. R. Bendre, J. C. van der Meer, R. M. Cuzner and C. Goshaw, "Four pole neutral-point clamped three phase converter with low common mode voltage output," US patent, Pub. No. US2008/0298103 A1, Pub. date Dec. 4, 2008.

[11] A. von Jouanne, S. Dai and H. Zhang, "A multilevel inverter approach providing DC-link balancing, ride-through enhancement, and common-mode voltage elimination," IEEE Trans. on Industrial Electronics, Vol. 49(4), pp. 739-745, August 2002. Gerardo Escobar ABB Switzerland Ltd. pages 18 of 18 9ADB002756-021

[12] D. A. Rendusara, P. N. Enjeti, "An improved inverter output filter configuration reduces common and differential modes dv/dt at the motor terminals in PWM drive systems," IEEE Trans. on Power Electronics, Vol. 13(6), pp. 1135-1143, November 1998.

[13] J. W. Kolar, U. Drofenik, J. Minibock and H. Ertl, "A new concept for minimizing highfrequency common-mode EMI of three-phase PWM rectifier systems keeping high utilization of the output voltage," in Proc. 15th Annual IEEE Applied Power Electronics Conference and Exposition APEC'00, Vol. 1, 2000, pp. 519-527.

[14] D. G. Holmes and T. A. Lipo, Pulse Width Modulation for Power Converters: Principles and Practice, IEEE Press, Series on Power Engineering, USA, 2003, pp. 226-230.

[15] A. Falk, K. De Brabandere, F. Greizer, M. Victor, T. Westpahl, H. Wolf and T. Buelo, "Three-phase inverter," Applicant SMA Solar Tech. AG, Pub. No. US2009244936 A1, Pub. date Oct. 1, 2009.

[16] V. Blasko and V. Kaura, "A novel control to actively damp resonance in input LC filter of a three-phase voltage source converter," IEEE Trans. on Ind. Appl., Vol. 33(2), pp. 542-550, March/April 1997.

[17] A. Papavasiliou, S. A. Papathanassiou, S. N. Manias and G. Demetriadis, "Current control of a voltage source inverter connected to the grid via LCL filter," in Proc. IEEE Power Electronics Specialists Conf. PESC'07, 17-21 Jun., 2007, pp. 2379-2384.

[18] L. A. Serpa, S. Ponnaluri, P. M. Barbosa and J. W. Kolar, "A modified direct power control strategy allowing the connection of three-phase inverters to the grid through LCL filters," IEEE Trans. on Ind. Appl., Vol. 43(5), pp. 1388-1400, September/October 2007.

[19] A. Nabae, I. Takahashi and H. Akagi, "A New Neutral-Point-Clamped PWM Inverter," IEEE Trans. on Industry Appl., Vol. IA-17(5), pp. 518-523 September/October 1981.

[20] P. Knaup, "Inverter," Applicant CONERGY AG, Pub. No. US2009/0003024 A1, Pub. date Jan. 1, 2009.

[21] G. Escobar, J. Leyva-Ramos, J. M. Carrasco, E. Galvan, R. C. Portillo, M. M. Prats, L. G. Franquelo, "Modeling of a three level converter used in a synchronous rectifier application," in Proc. IEEE 35th Annual Power Electronics Specialists Conference PESC 04, 2004, Vol. 6, pp. 4306-4311.

[22] V. Kaura and V. Blasco, "Operation of a phase locked loop system under distorted utility conditions," IEEE Trans. on Ind. Appl., Vol. 33, Issue 1, pp. 58-63, January/February 1997.

[23] A. Coccia, G. Escobar, L. A. Serpa, M. Paakkinen, S. Pettersson, "Control method for single-phase grid-connected LCL inverter", European Patent Application EP 2 362 515 A1.

What is claimed is:

1. A method for minimizing common mode voltage in an arrangement having a three-phase, multi-level inverter having a DC-link with a neutral point dividing the DC-link into two halves, wherein an output voltage of the inverter is controlled on the basis of an output voltage reference, an output LCL-filter connecting the inverter to a grid, and a virtual-ground connection between the LCL-filter and the neutral point of the DC-link, the method comprising:
determining a zero-sequence component of an LCL-filter inverter-side current;
calculating a zero-sequence damping and voltage balancing term based on the LCL-filter inverter-side current zero-sequence component and voltages over the two halves of the DC-link; and
adding the zero-sequence damping and voltage balancing term to the output voltage reference.

2. The method according to claim 1, wherein calculating the zero-sequence damping and voltage balancing term is performed based on the following equation:

$$e_\gamma^* = -R_d\left(x_1^2 i_{1\gamma} - \frac{4P_{DC}}{\sqrt{3}} x_2\right),$$

where x1 represents a sum of voltages over the DC-link halves, x2 is a voltage difference between the halves, $i_{1\gamma}$ is a zero-sequence component of an inverter-side current of the LCL-filter, Rd is a design coefficient, and PDC is a power reference.

3. The method according to claim 2, wherein calculating the damping and balancing term further comprises
reducing third-harmonic content of the damping and balancing term;
calculating a third-harmonic term based on the inverter output voltage control term; and
adding the third-harmonic term to the damping and balancing term.

4. The method according to claim 1, wherein calculating the zero-sequence damping and voltage balancing term is performed based on the following equation:

$$e_\gamma^* = -R_{d1} i_{1\gamma} + R_{d2} x_2,$$

where x2 is a voltage difference between the halves, i1γ is a zero-sequence component of an inverter-side current of the LCL-filter, and Rd1 and Rd2 are design coefficients.

5. The method according to claim 4, wherein calculating the damping and balancing term further comprises
reducing third-harmonic content of the damping and balancing term;
calculating a third-harmonic term based on the inverter output voltage control term; and
adding the third-harmonic term to the damping and balancing term.

6. The method according to claim 1, wherein calculating the zero-sequence damping and voltage balancing term is performed by using a PI-controller.

7. The method according to claim 6, wherein calculating the damping and balancing term further comprises
reducing third-harmonic content of the damping and balancing term;
calculating a third-harmonic term based on the inverter output voltage control term; and
adding the third-harmonic term to the damping and balancing term.

8. The method according to claim 1, wherein calculating the damping and balancing term further comprises
reducing third-harmonic content of the damping and balancing term;
calculating a third-harmonic term based on the inverter output voltage control term; and
adding the third-harmonic term to the damping and balancing term.

9. The method according to claim 8, wherein calculating the damping and balancing term further comprises
reducing third-harmonic content of the damping and balancing term;
calculating a third-harmonic term based on the inverter output voltage control term; and
adding the third-harmonic term to the damping and balancing term.

10. The method according to claim 1, wherein calculating the zero-sequence damping and voltage balancing term comprises:
forming a zero-sequence component model of the LCL filter;

forming a controller for the zero-sequence component model; and forming a zero-sequence damping and voltage balancing term by using the controller.

11. The method according to claim 10, wherein calculating the zero-sequence damping and voltage balancing term is performed based on the following equation:

$$e_\gamma^* = -R_d\left(x_1^2 i_{1\gamma} - \frac{4P_{DC}}{\sqrt{3}} x_2\right),$$

where x1 represents a sum of voltages over the DC-link halves, x2 is a voltage difference between the halves, i1γ is a zero-sequence component of an inverter-side current of the LCL-filter, Rd is a design coefficient, and PDC is a power reference.

12. The method according to claim 10, wherein calculating the zero-sequence damping and voltage balancing term is performed based on the following equation:

$$e_\gamma^* = -R_{d1} i_{1\gamma} + R_{d2} x_2,$$

where x2 is a voltage difference between the halves, i1γ is a zero-sequence component of an inverter-side current of the LCL-filter, and Rd1 and Rd2 are design coefficients.

13. The method according to claim 10, wherein calculating the zero-sequence damping and voltage balancing term is performed by using a PI-controller.

14. The method according to claim 10, wherein calculating the damping and balancing term further comprises
  reducing third-harmonic content of the damping and balancing term;
  calculating a third-harmonic term based on the inverter output voltage control term; and
  adding the third-harmonic term to the damping and balancing term.

15. An apparatus for an arrangement having a three-phase, multi-level inverter including a DC-link with a neutral point dividing the DC-link into two halves, wherein an output voltage of the inverter is controlled based on an output voltage reference, an output LCL-filter connecting the inverter to a grid, and a virtual-ground connection between the LCL-filter and the neutral point of the DC-link,
  the apparatus comprising a controller configured to:
    determine a zero-sequence component of an LCL-filter inverter-side current;
    calculate a zero-sequence damping and voltage balancing term based on the LCL-filter inverter-side current zero-sequence component and voltages over the two halves of the DC-link; and
    add the zero-sequence damping and voltage balancing term to the output voltage reference.

* * * * *